United States Patent
Barrier et al.

(10) Patent No.: US 11,756,140 B2
(45) Date of Patent: Sep. 12, 2023

(54) METHOD AND SYSTEM FOR ROUTING PATH SELECTION

(71) Applicant: AMADEUS S.A.S., Biot (FR)

(72) Inventors: Anthony Alexis Ghislain Barrier, Antibes (FR); Simon Nanty, Antibes (FR); Youri Thibault Marie Le Toquin, Nice (FR); Chakib Belgani, Valbonne (FR); Erwan Viollet, Mougins (FR)

(73) Assignee: Amadeus S.A.S., Biot (FR)

( * ) Notice: Subject to any disclaimer, the term of this patent is extended or adjusted under 35 U.S.C. 154(b) by 153 days.

(21) Appl. No.: 17/098,893

(22) Filed: Nov. 16, 2020

(65) Prior Publication Data
US 2022/0156859 A1    May 19, 2022

(51) Int. Cl.
    *G06Q 50/14*      (2012.01)
    *G06Q 30/0283*    (2023.01)
    *G06Q 30/0601*    (2023.01)
    *G06N 20/00*      (2019.01)

(52) U.S. Cl.
    CPC ............ *G06Q 50/14* (2013.01); *G06N 20/00* (2019.01); *G06Q 30/0284* (2013.01); *G06Q 30/0627* (2013.01)

(58) Field of Classification Search
    CPC .................. G06Q 50/14; G06Q 30/0627
    See application file for complete search history.

(56) References Cited

U.S. PATENT DOCUMENTS

| | | | |
|---|---|---|---|
| 11,054,270 B1* | 7/2021 | Singh | G08G 1/096888 |
| 2013/0304526 A1* | 11/2013 | Boyd | G06Q 10/02 705/5 |
| 2014/0149157 A1* | 5/2014 | Shaam | G06Q 50/14 705/26.63 |
| 2016/0203422 A1* | 7/2016 | Demarchi | G06F 16/29 705/6 |
| 2016/0260183 A1* | 9/2016 | Kim | G06Q 30/0627 |
| 2018/0189674 A1* | 7/2018 | Hillard | G06N 20/00 |
| 2020/0004357 A1* | 1/2020 | Harada | G06F 3/041 |
| 2021/0004727 A1* | 1/2021 | Bin Awang Pon | G06N 5/01 |

(Continued)

OTHER PUBLICATIONS

On optimizing airline ticket purchase timing. Groves, William; Gini, Maria. ACM Transactions on Intelligent Systems and Technology7. 1: 3 (28 .). ACM. (Oct. 2015) (Year: 2015).*

(Continued)

*Primary Examiner* — Michael Misiaszek
(74) *Attorney, Agent, or Firm* — Thompson Hine LLP

(57) ABSTRACT

Methods and systems for selecting fare paths. A machine learning model is trained on historical fare path data. An output of the machine learning model provides a fare path selection prediction for each fare path. In response to a request from a client device, flight paths fulfilling the request are determined, fare paths are determined by combining the set of flight paths with pricing units, the machine learning model is applied on the fare paths to determine a subset of fare paths for which the selection prediction is higher than a threshold, details of the subset of fare paths are queried, valid fare paths are determined, and details of a subset of the valid fare paths are returned to the client device. The details of the subset of the valid fare paths may be displayed on the client device for final selection of a fare path.

26 Claims, 10 Drawing Sheets

(56) References Cited

U.S. PATENT DOCUMENTS

2021/0012439 A1* 1/2021 Wenger .................. G06N 5/04
2022/0075597 A1* 3/2022 Warner ................ G06N 3/063

OTHER PUBLICATIONS

Modelling the Air Ticket Purchase Behavior Incorporating Latent Class Model. Lu, Jing; Wang, Zheqing; Gu, Yingjing; Yang, Wenhui. Mathematical Problems in Engineering 2020New York: Hindawi Limited. (2020) (Year: 2020).*

Depth-first search'. Wikipedia. Jan. 17, 2021. retrieved from the internet <https://en.wikipedia.org/w/index.php?title=Depth-first_search&oldid=1000931408>.

A* search algorithm'. Wikipedia. Jan. 25, 2021. retrieved from the internet <https://en.wikipedia.org/w/index.php?title=A*_search_algorithm&oldid=1002617861>.

Dijkstra's algorithm'. Wikipedia. Feb. 2, 2021. retrieved from the internet <https://en.wikipedia.org/w/index.php?title=Dijkstra%27s_algorithm&oldid=1004445430>.

* cited by examiner

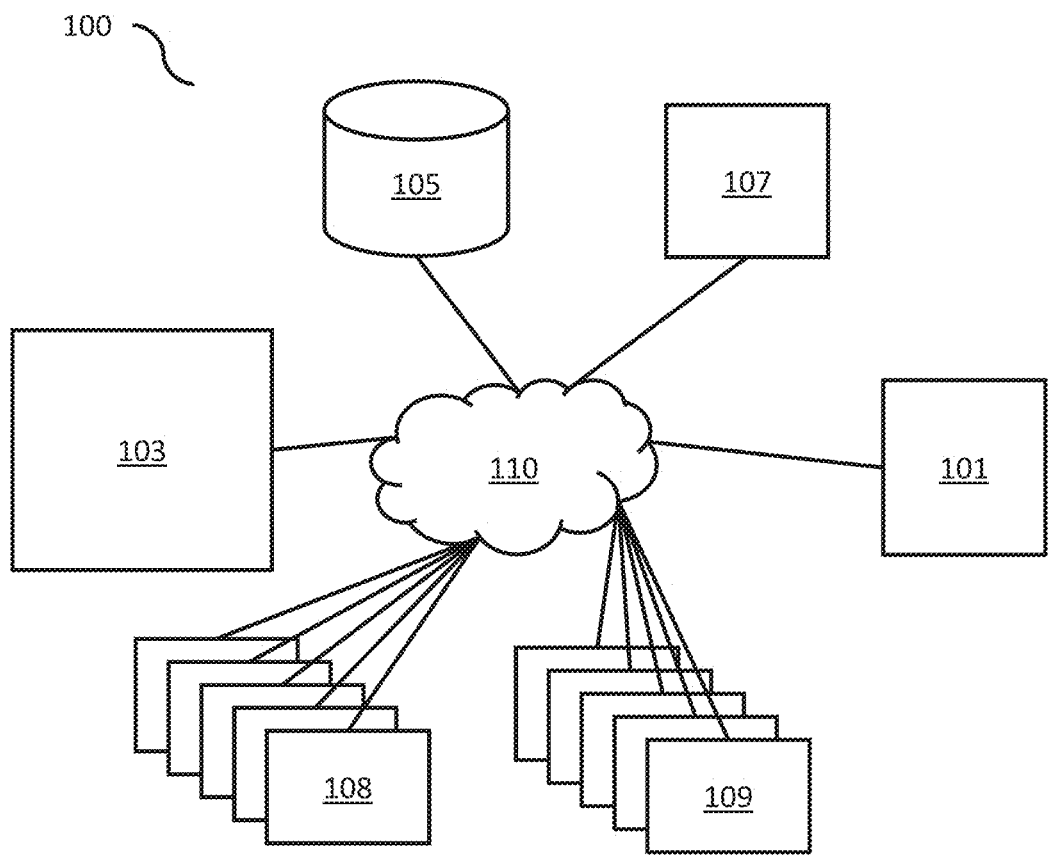
Fig. 1A
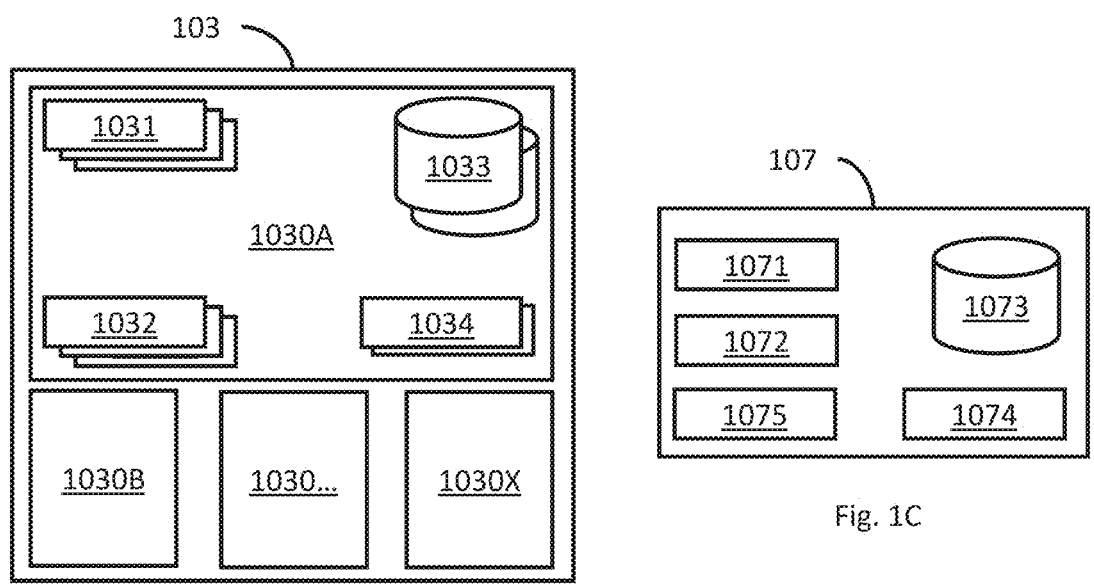
Fig. 1B
Fig. 1C

METHOD AND SYSTEM FOR ROUTING PATH SELECTION

TECHNICAL FIELD

The present invention generally relates to methods and systems for selecting routing paths, in particular, for selecting a subset of routing paths before querying details of the routing paths.

BACKGROUND

The search for a route in a network, i.e., a path from a start node to an end node via one or more edges, is crucially relevant in many areas. If the networks, which are nothing different than graphs, are relatively simple, standard algorithms, such as Depth First Search, can be used to determine all possible routes. But this gets impossible if the graphs get larger. In many cases, the path fulfilling a single target function is requested, for example the shortest path from the start node to the end node should be determined. If the graphs are again not too large, this problem can be solved by applying algorithms like Dijkstra's algorithm or A*-algorithm. However, in reality the graphs are often comprising hundreds or thousands of nodes and edges and a plurality of target functions may be relevant for a client when selecting a path. Hence, it is impossible to determine the target functions for all possible routes in a limited time and provide the client with the results in an applicable response time.

For example, if data packets have to be transferred from a source computing system to a target computing system, a plurality of paths can be chosen to route the data packets. The problem gets more complex if edges of a route may be provided by different operators or carriers, which may not cooperate with other operators. Moreover, an operator may also provide different data volumes and/or transmission speeds on a same edge in the network depending on rules regarding a tariff or the estimated utilization of the network at different transmission time. These further characteristics of the route may lead to an exponential increase of the search space.

Another example is the search for a flight path from a departure location to a destination location. There may be an abundance of possible flights operated by different carriers—with or without intermediate stops—fulfilling the request. On each of these flights may apply different rules that define which fare(s) can be used. To finally build the products, i.e., the specific flights with their details (flight number, fare, price, baggage, etc.), hundreds or thousands of queries may be required to be sent to the carriers or the meta provider platforms.

The present invention tackles this problem by defining routing paths as a combination of a route and at least one characteristic. These routing paths are then filtered by the use of a machine learning model to reduce the search space for querying details of routes.

SUMMARY

A first aspect of the invention concerns a computer-implemented method for selecting routing paths. The routing path comprises a route and at least one characteristic from a set of characteristics, and the route comprises at least a start node and an end node and is provided by at least one carrier.

The method logs data of selected routing paths in response to requests from client devices to collect historical data of selecting routing paths and stores the data of selected routing paths in a data storage. Thereafter, a machine learning model is trained on the historical data of selecting routing paths received from the data storage. The output of the machine learning model is a selection prediction for the routing path. In response to a new request from a client device, a set of routes fulfilling the request is determined in order to determine a set of routing paths by combining the set of routes with characteristics from the set of characteristics. The trained machine learning model is applied on the set of routing paths to determine a subset of routing paths for which the selection prediction is higher than a threshold. Details of the subset of routing paths are then queried and valid routing paths determined. Finally, the details of at least a subset of the valid routing paths are returned to the client device.

According to a second aspect of the invention, a distributed computing system for selecting routing paths is provided.

According to a third aspect of the invention, a computer program product for selecting routing paths is provided.

BRIEF DESCRIPTION OF THE DRAWINGS

The subsequent description of embodiments is based on the accompanying set of figures in which similar reference numerals refer to similar elements and messages.

FIG. 1A is a schematic overview of the distributed computing environment as described herein.

FIG. 1B depicts a high-performance computing system.

FIG. 1C depicts an inference computing system according to embodiments.

DETAILED DESCRIPTION

Figure 2:
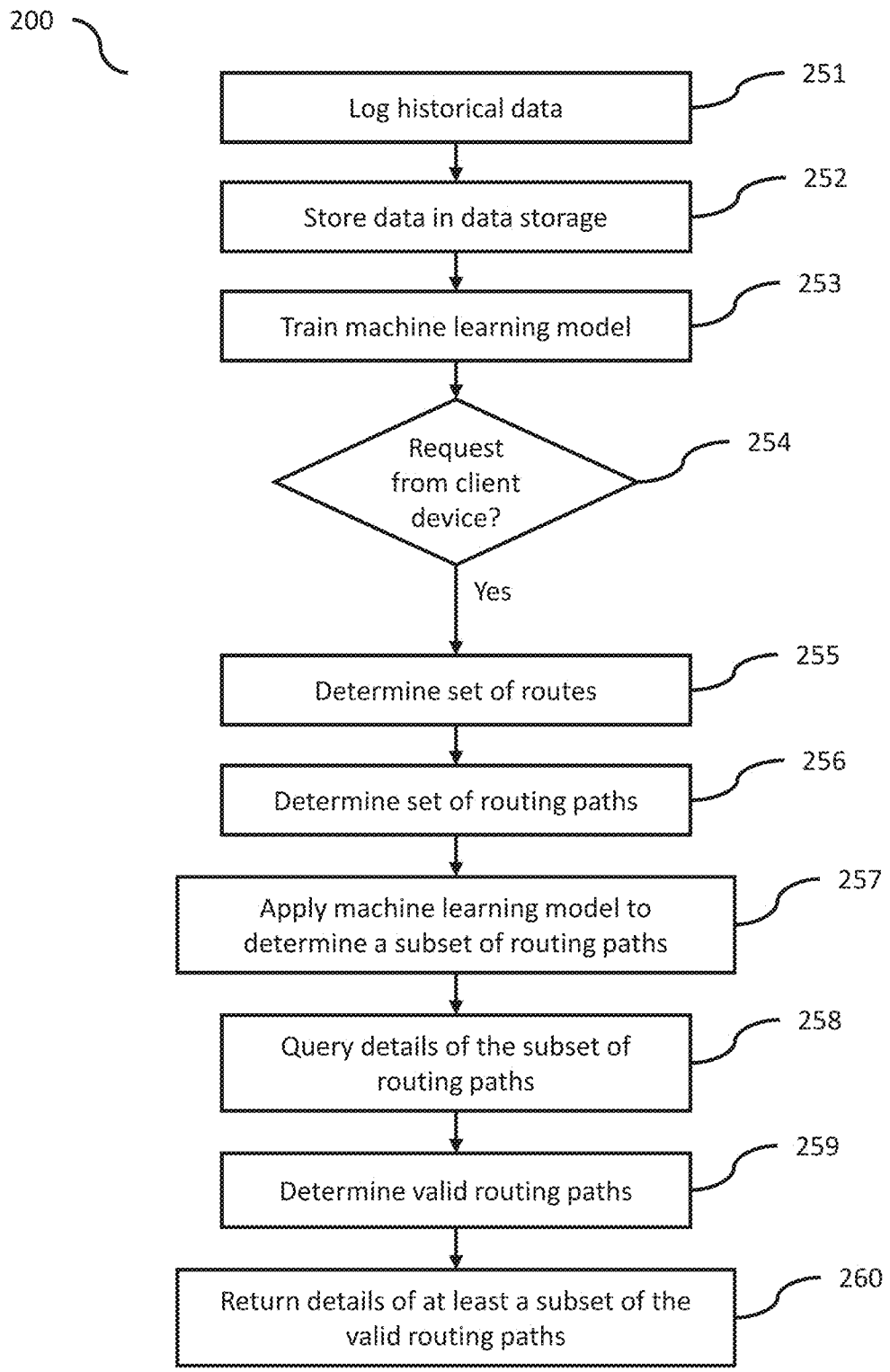
FIG. 2 presents a high-level flow diagram of the method described herein.

As already outlined at the outset, the methodologies described herein relate to methods and systems for selecting routing paths, in particular, to the selection of a subset of routing paths before querying details of the routing paths. Before coming to the description of the figures, a few explanations of wordings used in this application are presented.

A route refers to a path from a start node to an end node in a network. A network is defined as a combination of nodes and edges, wherein an edge connects two nodes. The route may also comprise one or more intermediate nodes but may also be a direct link between the start node and end node. If the start node and the end node are identical, e.g., for a round trip in a travel network, usually at least one intermediate node is provided. Additional intermediate nodes can also be determined while searching for possible routes in the network.

Routing paths generally refer to a combination of a route and at least one characteristic of a set of characteristics. The set of characteristics may comprise any information that is useful for a selecting routing paths to be queried, e.g., if a route or a part of the route. For example, the characteristics may be determined to help the model identify the most relevant routing paths.

For example, if routes in computer network are considered, characteristics of the routes may relate to the volume of data that can be sent on parts of the route, also called segments of the route, per second, e.g., the data rate or bitrate. The set of characteristics may then for example comprise {very high, high, medium, low, very low}, wherein the thresholds are defined and may be for example {>1000 Mbits/s, 1000-500 Mbits/s, 500-100 Mbits/s, 100-50 Mbit/s, 0 Mbits/s}.

A routing path may then be defined by how the data is routed in the network, e.g., over which intermediate nodes, provided by which operators etc., and by at least one characteristic of the route, e.g., high data rate for the complete route or high data rate for a first segment provided by a first operator and very high data rate for a second segment provided by a second operator. Depending on the number of characteristics in the set of characteristics and the possible subsegments of a route that may have different characteristics, the number of routing paths is a multiple of the number of routes.

Now turning to FIG. 1A, which is a schematic overview of the distributed computing environment 100, in which a selecting routing paths may be required. The distributed computing environment 100, also referred to as distributed computing system herein, comprises a service computing system 101, a dedicated high-performance computing system 103, a data storage 105, a dedicated inference computing system 107, at least one client device 108, and at least one provider computing system 109 that are all connected over a network 110. The network 110 may be a wide area network, global network, the Internet, or similar network, may be a public or a private network, and may include multiple interconnected networks as is known in the art.

The service computing system 101 may be a computing system of a routing specialist, a travel content provider, a booking agent, a meta search provider and the like, which receives request from client devices 108 over the network 110 for routes, routing path and/or other information that requires to determine routes and/or routing paths. The service computing system 101 may consist of a plurality of servers in a server infrastructure that handle requests of the client devices 108. A plurality of applications may be executed on these servers to execute the method described herein as well as to execute several other tasks (not described).

The dedicated high-performance computing system 103 is specifically designed for training of machine-learning models for evaluating routing paths. The dedicated high-performance computing system 103 may be part of the same server infrastructure as the service computing system 101 and/or located at the same location but may also be located in a remote location and independent of the service computing system 101.

The data storage 105 may comprise volatile and non-volatile memory, multi-level cell flash memory, triple level cell flash memory, and/or cloud storage or backup systems.

It should further be appreciated that the data storage 105 described herein may be a combination of multiple storage resources, including but not limited to those referenced herein. The data storage 105 may further include different storage technologies, may be situated at different locations, or may also be part of the same server infrastructure as the service computing system 101. The data storage 105 is used for logging data of selected routing paths in response to requests from client devices and may also be used for storing any other kind of data required or processed by the service computing system 101, the dedicated high-performance computing system 103, or dedicated inference computing system 107.

The dedicated inference computing system 107 is specifically designed for applying machine-learning models may be part of the same server infrastructure as the service computing system 101 and/or located at the same location but may also be located in a remote location and independent of the service computing system 101. The dedicated inference computing system 107 may be connected with the dedicated high-performance computing system 103, the data storage 105, and the service computing system 101. The connection may be a direct link in a network, such as the network 110, but may also comprise an indirect connection. For example, the dedicated high-performance computing system 103 may store data in the data storage 105, which is then retrieved by the dedicated inference computing system 107.

The at least one client device 108 may be a computing system, e.g., personal computer, server or server farm, mobile phone etc., that requests a route to send data, a computing system of a meta search engine, of a travel agent or of an end user. The at least one client device 108 sends requests to the service computing system 101 over the network 110 and receives replies to its requests over the network 110.

The at least one provider computing system 109 may be a computing system of a carrier or travel provider, e.g., an airline or a train company, of a mobile phone operator, of a network operator, and the like. The at least one provider computing system 109 may also be allowed to store data in the data storage 105 or have access to other components of the distributed computing system 100. Alternatively, the dedicated high-performance computing system 103, the data storage 105, and the dedicated inference computing system 107 may be encapsulated from other components of the distributed computing system 100 and may only be accessed by the service computing system 101, which has an interface to communicate with the client devices 108 and the provider computing systems 109.

FIG. 1B gives a more detailed overview of the dedicated high-performance computing system 103. The dedicated high-performance computing system 103 may comprise a cluster of servers 1030A, B, C, . . . , X. Each server 1030A, B, C, . . . , X is equipped with at least one central processing unit (CPU) 1031 and at least one graphics processing unit (GPU) 1032 that enable parallel processing of the training of machine-learning models. The CPUs 1031 may be multi-core processors comprising a plurality of CPU cores, each including a register, at least one processing unit, such as an arithmetic logic unit (ALU), a floating-point unit (FPU) or the like, and other optional components, such as a memory management unit (MMU), a shared memory, or a cache.

The GPUs 1032 may also comprise a plurality of GPU cores or streaming multiprocessors, which comprise many different components, such as at least one register, at least one cache and/or shared memory, and a plurality of ALUs, FPUs, tensor processing unit (TPU) or tensor cores, and/or other optional processing units. Each server 1030A, B, C, . . . , X may also comprise at least one storage system 1033, such as a random-access memory (RAM), read-only memory (ROM), and the like, and various other components 1034, such as a motherboard, a bus, a cooler, and the like. The high-performance computing system may also comprise other storage systems (not shown) comprising data management systems for high-performance access, e.g., directly provisioned on a server 1030A, B, C, . . . , X and/or made available on a storage platform that is in close proximity to the servers 1030A, B, C, . . . , X.

FIG. 1C presents a more detailed overview of the dedicated inference computing system 107. The dedicated inference computing system 107 may comprise at least one CPU 1071, at least one GPU 1072, at least one storage system 1073 and/or various other components 1074, such as a motherboard, a bus, a cooler, and the like. Usually, the dedicated inference computing system 107 comprises less components, i.e., a lower number of GPUs, CPUs, storage systems etc., than a server of the servers 1030A, B, C, . . . , X of the dedicated high-performance computing system 103. However, in some embodiments, the the dedicated inference computing system 107 may be equipped like a server 1030A, B, C, . . . , X of the dedicated high-performance computing system 103.

In some embodiments, the dedicated inference computing system 107 comprises a hardware-based inference accelerator architecture, that is, the inference computing system comprises specifically designed chips 1075 in addition to the CPU 1071 and/or GPU 1072, e.g., a neural processing unit (NPU) for acceleration of inference calculations of neural networks or other hardware accelerator units for inference calculations of other machine-learning models implemented on field-programmable-gate-arrays (FPGA) and application-specific-integrated-circuit (ASIC). The hardware-based inference accelerator architecture is designed to accelerate a segment of inference calculations of the machine-learning model. For example, specifically designed chips for neural network inference may consist of an array of processing engines, wherein each processing engine performs the computation of a neuron in the neural network. Or specifically designed chips for gradient boosted trees inference may comprise many a plurality of small static random-access memories (SRAM), each having a plurality of floating-point adders for updating the gradients of the trees.

The method for selecting routing paths described herein is presented in the high-level flow diagram of FIG. 2. Basically, the method 200 comprises two stages. The first stage (comprising boxes 251 to 253) can be attributed to training of a machine learning model, the second stage (comprising boxes 254 to 260) to application of the machine learning model.

To enable the training of the machine learning model, data of selected routing paths in response to historical requests from client devices 108 is logged (box 251). The service computing system 101 may therefore create files or database entries that comprise information about a requested routing path. In some embodiments, the files or database entries comprise the routing paths determined in response to a historical request from a client device, the respective routing paths provided to the requesting client device and the routing paths selected by the requesting client device. The files or database entries may also comprise further data that is useful for later processing, such as data extracted from the historical request, intermediate nodes, GPS information of the location of the start node, the end node, and/or intermediate node, time/date of the request, providers of the route, and the like. In other embodiments, the files or database entries may be logged at least partially by a third-party system.

Then, the historical data is stored in a data storage (box 252), such as for example the data storage 105. In other embodiments, the historical data is alternatively or additionally stored in a memory of the service computing system. This historical data is thereafter used for training of a machine-learning model (box 253). This training may be performed at a dedicated high-performance computing system 103.

The machine learning model may be a supervised or semi-supervised model. It may be one of a gradient boosted tree, a neural network, or a random forest or a combination thereof. The machine learning model may also be updated regularly, e.g., every day, week, or month, by restarting the training including newly logged data. The machine learning model is trained to output a selection prediction for a routing path. When the training has been finished, the machine learning mode, i.e., the model parameters, may be stored at the data storage 105, at the service computing system 101 at the dedicated inference computing system 103, or at any suitable other location from which they may be accessed by the dedicated inference computing system 103.

With the help of the machine learning model, the process of presenting/returning routes or routing paths to a requesting client device can be accelerated. The method 200 simplifies the computation of routing paths returned to client devices 108 by selecting routing paths that have the highest probabilities to be selected by the client device 108. As the most useful routing paths can be determined by the machine learning model, many other routing paths can be discarded, which reduces the search space, i.e., the number of routing paths for which details have to be queried. Thereby, the speed of presenting routing paths to the client devices 108 is enhanced and the computational costs are reduced. For example, it has been measured that the response time for answering customer inquiries is reduced by up to 15% and the consumption of the computational resources by up to 50% while ensuring to find the routing paths satisfying the requirements of the client devices. These improvements hold even more for embodiments, in which the application of the machine learning model is performed on the dedicated inference computing system 107.

After a request from a client device 108 (box 254), a set of routes is determined that fulfils the request. For example, if the client device 108 requests to send data packages from server A to server B in a server network, the method 200 determines all possible or applicable routes for the data packages. Let the number of applicable routes from server A to server B be three, namely from A over intermediate server 1 and intermediate server 2 to server B {A=>S1=>S2=>B}, from server A over intermediate server 2 to server B {A=>S2=>B}, and from server A over intermediate server 1 to server B {A=>S1=>B}. In some embodiments, this determination is executed at the service computing system 101 but, in other embodiments, it may also be executed at the inference computing system 107 or at any other suitable computing system or even distributed among several computing systems.

Then, a set of routing paths is determined (box 256) by combining the set of routes with characteristics from the set of characteristics. For example, if the set of characteristics comprise only two values, e.g., {1, 2}, for the number of data channels that can be booked on each edge of the server network described above, the resulting set of routing paths will consist of 2^3 (for the first route)+2^2 (for the second route)+2^2 (for the third route)=16 routing paths. Hence, as can be easily seen, the number of routing paths may be much higher than the number of routes so that querying details of all routing paths becomes impossible for many applications.

The trained machine learning model is applied (box 257) on the set of routing paths to reduce this set. In some embodiments, this application of the machine learning model is performed at the dedicated inference computing system 107. Alternatively, the inference calculations of the machine learning model may also be executed at the service computing system 101 and/or at the dedicated high-performance computing system 103. The machine learning model is applied on each routing path of the set of routing paths so that a selection prediction is calculated for each of the routing paths.

Thereafter, a subset of routing paths is determined for which a threshold, e.g., a percentage threshold, is lower than the selection prediction. This determination may take place at the dedicated inference computing system 107, at the high-performance computing system 103 or at the service computing system 101. In some embodiments, the threshold is set by an application running in the distributed computing system 100 or hardcoded in the computer program determining the subset of routing paths.

Alternatively, the threshold may be adapted according to a measured computational capacity for querying details of the subset of routing paths. The computational resources currently used by the service computing system 101 may be measured and the free capacity of the computational resources may thereby be determined. The threshold may then be determined by reading a table stored in a data storage, such as the data storage 105, in which thresholds are mapped to free computational capacities.

For example, if a free computational capacity of the service computing system 101 is determined to be 30%, the threshold may be set to 0.5, i.e., every routing path is taken into the subset of routing path for which the selection prediction is higher than 50%. Or if a free computational capacity of the service computing system 101 is determined to be 15%, the threshold may be set to 0.8, i.e., every routing path is taken into the subset of routing path for which the selection prediction is higher than 80%. This ensures that—if the computing system is able to query more details—the client device can be provided with more information, i.e., a larger set of details for routing paths.

The details of the determined subset of routing paths are then queried (box 258). This may comprise querying the providers of the routing paths and/or querying a local or third-party database for the details, for example, the data storage 105. The details may comprise a final price and/or rules, e.g., individual rules for the routing path and/or standard industry rules, for selecting the routing path, e.g., for sending data packets along this path in the server network example. In embodiments in which the routing paths relate to flights, the details may also comprise a flight number, a departure and/or arrival time, stop-over times, baggage rules, and included meals.

After having queried the details of the subset of the routing paths, valid routing paths are determined (box 259). In some embodiments, rules for selecting a routing path have to be analysed to determine if a routing path can be validly selected. In other embodiments, valid routing paths are determined based on other details, e.g., if the client device 108 has excluded some details in the request. In yet other embodiments, the details may comprise a flag that enables a determination if a routing path is a valid routing path.

Finally, at least a subset of the queried details is returned to the client device 108. In some embodiments, all queried details are returned to the client device 108, however, in alternative embodiments only a subset is returned. For example, as stated above, the details may comprise rules or flags that determine if a routing path may be selected by a client device 108. These details may not be returned to the client device 108. In some embodiments, the client device 108 may then select a routing path or even a plurality of routing path and/or send new requests or other requests to the service computing system 101.

In an additional embodiment, while training the machine learning model, at least one additional feature of a route may be determined that has an impact on the selected routing path. For example, analysis of parameters of the model and/or the output of the trained model may show that the degree of deviation from a direct connection may have an impact on whether a routing path is selected or not. Alternatively or additionally, it may be determined that carrier information, i.e., information about carriers providing the routes, has an impact on whether a routing path is selected or not. Then, this at least one additional feature is also determined for each logged routing path and used as additional for the training of the machine learning model. Moreover, in response to a request from the client device 108, the at least one additional feature of a route in the set of routing paths is determined and used as additional input for the inference calculations of machine learning model.

Figure 3:
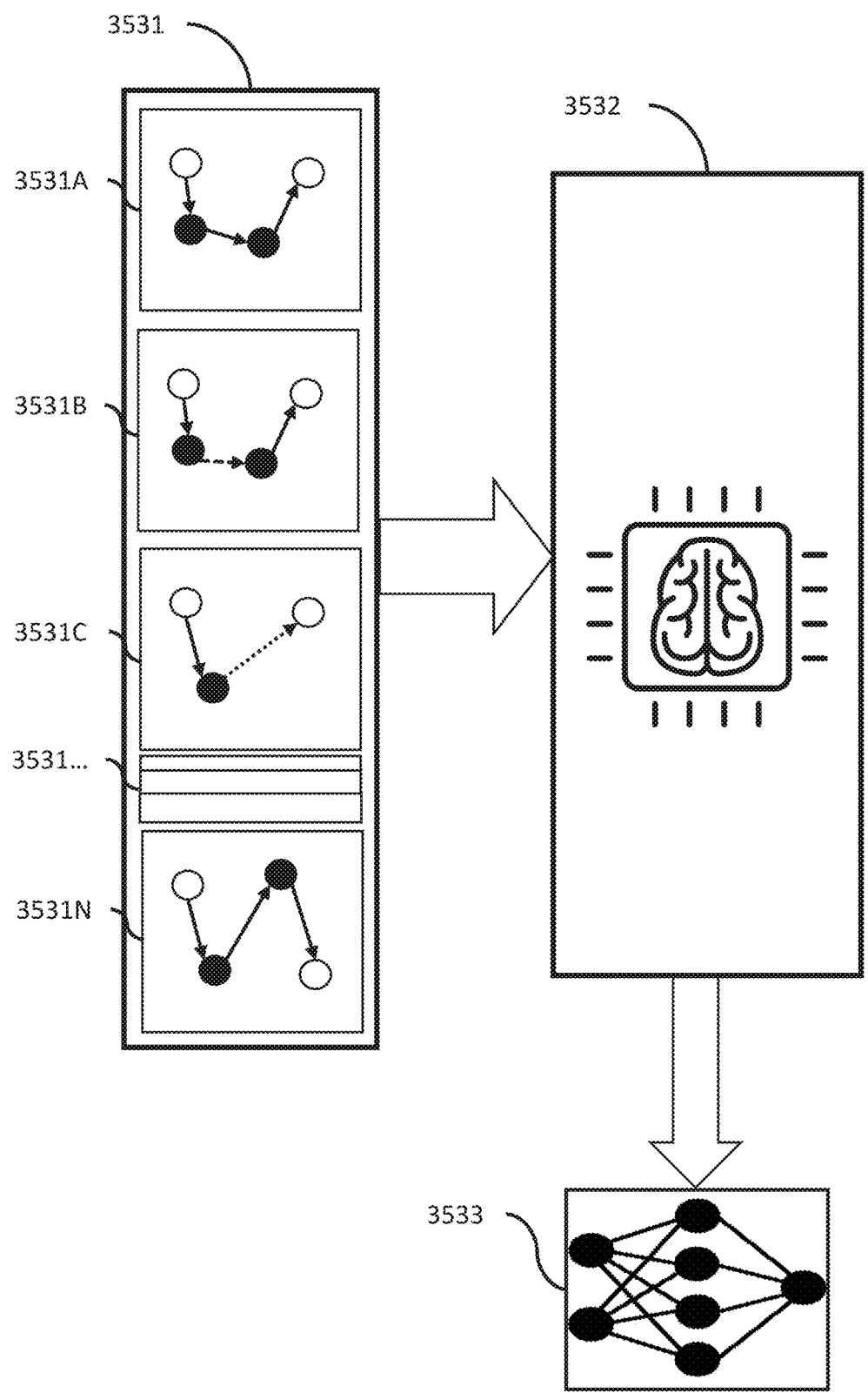
FIG. 3 is a medium-level presentation of how the machine-learning model is trained.

FIG. 3 corresponds to the box 253 of FIG. 2 and shows a more detailed but still medium-level view of the training of the machine learning model. The historical data 3531 stored in a data storage 105 comprises a plurality of routing paths 3531A . . . N from start to end nodes (empty nodes) over optional intermediate nodes (filled nodes). As can be seen, each routing path comprises the information of the route as well as characteristics, depicted with different shades of the edges.

For example, routing path 3531A only comprises solid edges between the nodes, which may correspond to the characteristics {1,1,1}. Routing path 3531B corresponds to the same route as routing path 3531A but comprises two solid edges and a dashed edge, which may correspond to the characteristics {1,2,1}. Routing path 3531C comprises a solid and a dotted edge, which may correspond to the characteristics {1,3}.

These routing paths 3531A . . . N are provided to a training phase 3532 of the machine learning model as well as further data. Further data may comprise details of the underlying query of the routing path, if the routing path was provided to the client device 108, and if the routing path was selected by the client device 108. The training results in model parameters and, thus, in a trained machine learning model 3533.

Figure 4:
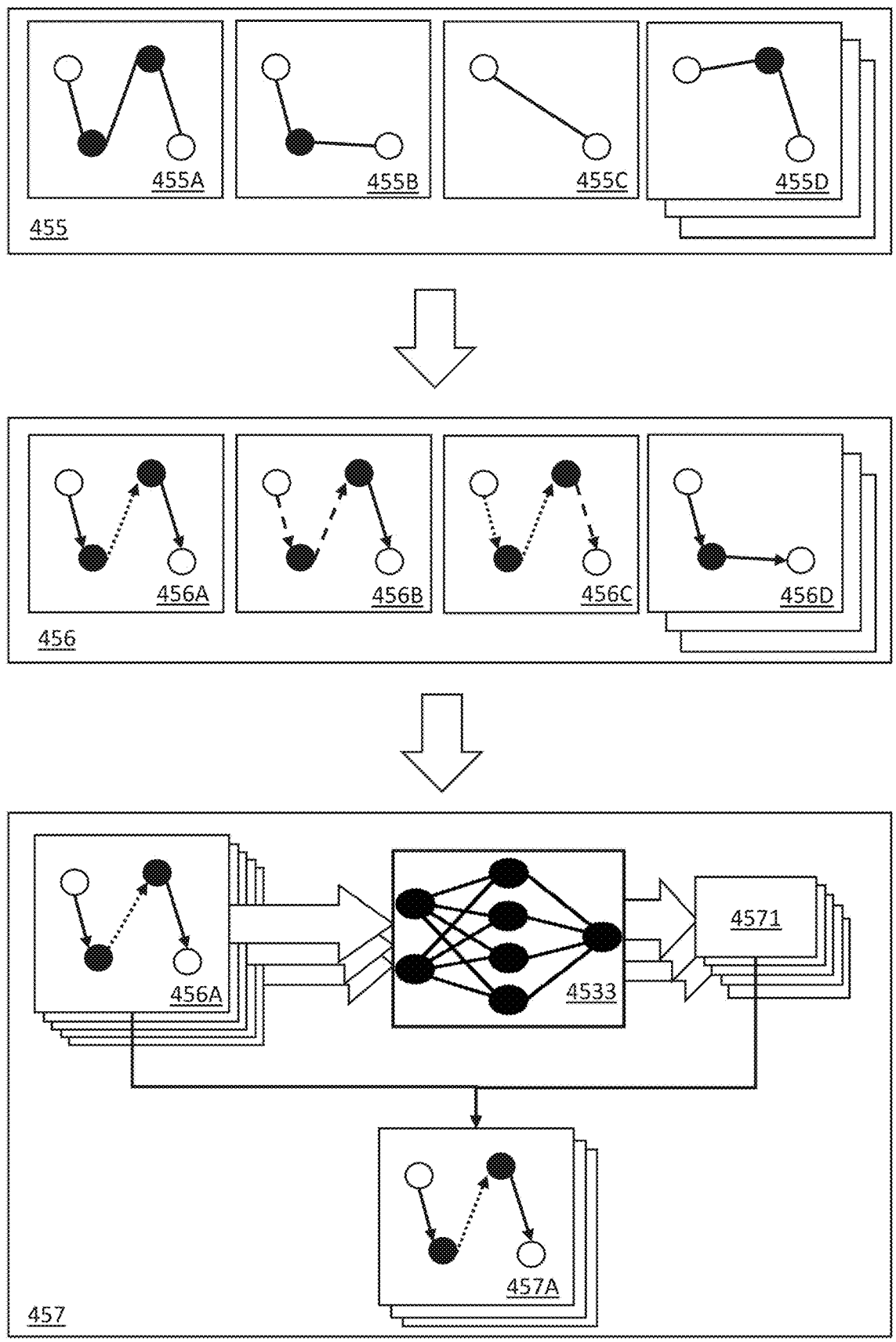
FIG. 4 depicts a medium-level example of how to determine a subset of routing paths.

FIG. 4 depicts a medium-level example of determining the subset of routing paths, i.e., it is a more detailed view of boxes 355 to 257 of FIG. 2. Assuming the client device 108 requests details for routing paths from start node (upper left corner) to an end node (lower right corner). At first 455, a plurality of routes 455A, B, C, D, . . . is determined, i.e., possible paths from the start node to the end node. Then 456, a plurality of routing paths 456A, B, C, D, . . . is determined by combining each route with possible characteristics. This will usually result in a much higher number of routing paths than routes.

To determine the subset of routing paths 457, all these routing paths 456A, B, C, D, . . . are propagated through the machine learning model 4533, which corresponds to the machine learning model 3533. If the output 4571, i.e., the selection prediction for the propagated routing path 456A, of the machine learning model 3533 is higher than a threshold, then the routing path 456A is taken into the subset of routing paths. Otherwise it is discarded. Hence, the resulting subset of routing path comprises fewer routing paths. In some embodiments, in particular if there is a high number of routing paths 456A, B, C, D, . . . in the set of routing paths, it is preferable that the number of routing paths 457A, . . . in the subset of routing paths is less than 80% of the number of routing paths 456A, B, C, D, . . . , more preferably less than 50%, and even more preferably less than 20%.

Figure 5A:
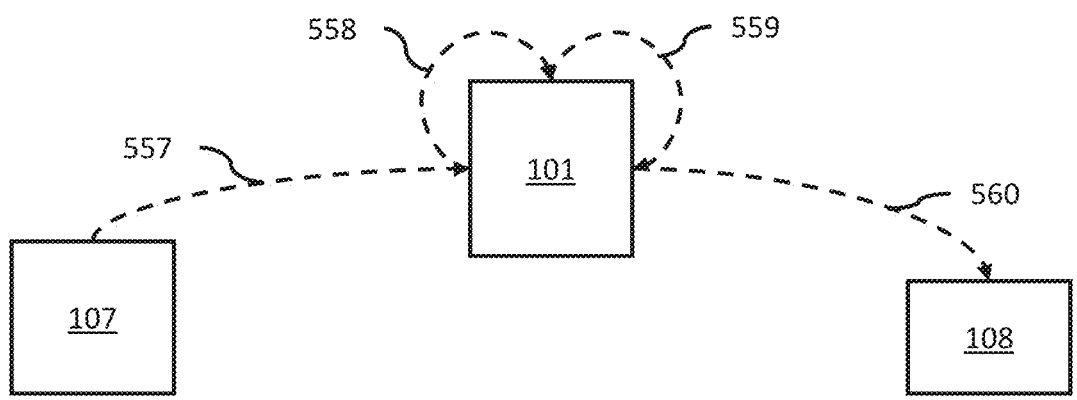
FIGS. 5A, 5B, and 5C show examples of how details of the subset of routing paths are queried, valid routing paths selected and returned to the client device.

FIGS. 5A, B, and C show embodiments for querying details of the subset of routing paths, selecting valid routing paths and returning details to the client device 108. In the embodiment of FIG. 5A, the dedicated inference computing system 107 returns the subset of the routing paths to the service computing system 101, shown by dashed line 557. The service computing system 101 then queries the details of the routing paths comprised in the subset of routing paths by requesting the data from at least one database system that is part of the service computing system 101, shown by dashed line 558. Then, the service computing system 101 determines the valid routing paths, shown by dashed line 559. Finally, the results, i.e., at least a subset of the details of at least a subset of the valid routing paths are returned to the client device 108, shown by dashed line 560.

Figure 5B:
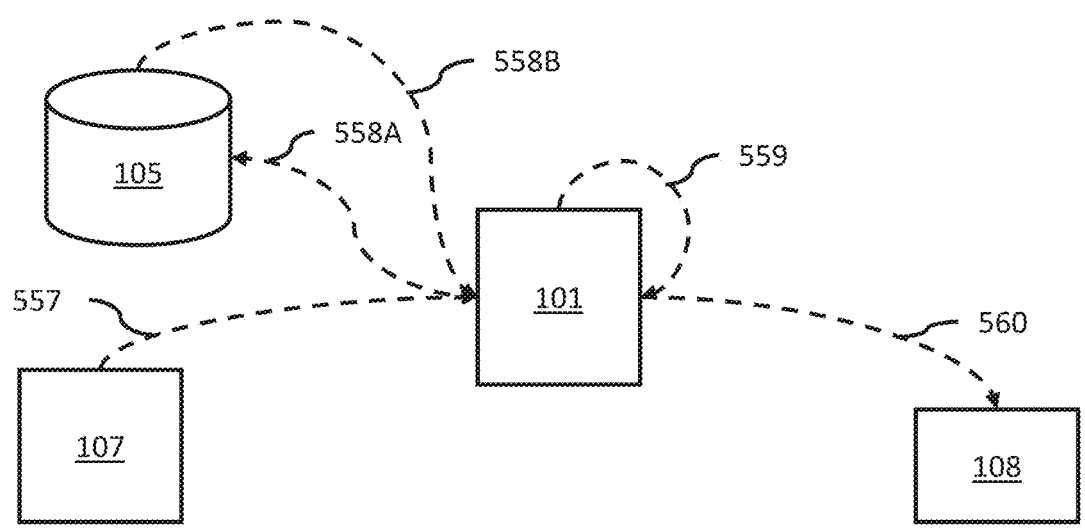

In the alternative embodiment of FIG. 5B, the dedicated inference computing system 107 returns the subset of the routing paths to the service computing system 101, shown by dashed line 557. The service computing system 101 then queries the details of the routing paths comprised in the subset of routing paths by sending requests to external database systems such as the data storage 105, shown by dashed line 558A. Then, the database system, e.g., the data storage 105, returns the details to the service computing system 101, shown by dashed line 558B. The service computing system 101 then determines the valid routing paths, shown by dashed line 559. Finally, the results, i.e., at least a subset of the details of at least a subset of the valid routing paths are returned to the client device 108, shown by dashed line 560.

Figure 5C:
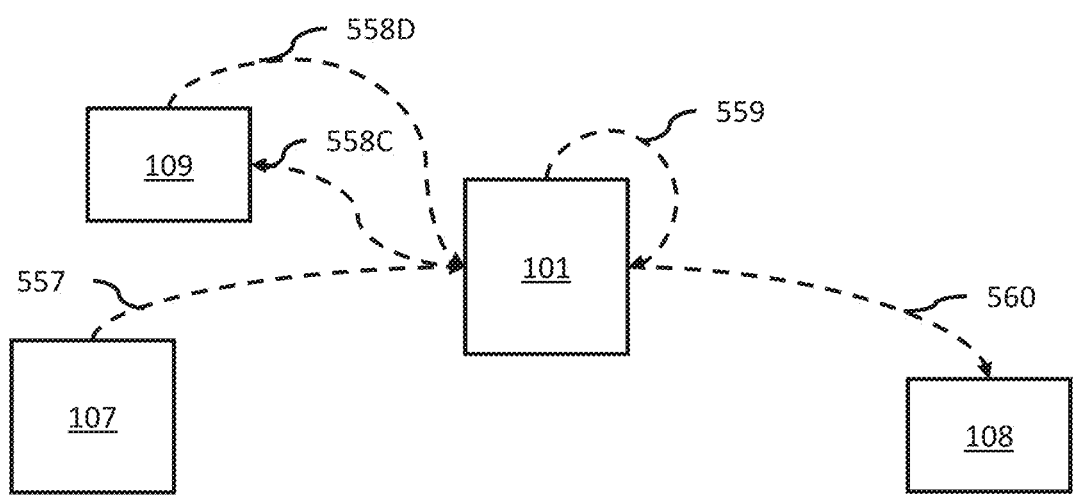

In the alternative embodiment of FIG. 5C, the dedicated inference computing system 107 returns the subset of the routing paths to the service computing system 101, shown by dashed line 557. The service computing system 101 then queries the details of the routing paths comprised in the subset of routing paths by sending requests to the carriers of the respective routes, such as to the provider computing systems 109, shown by dashed line 558C. Then, the provider computing system 109 returns the details to the service computing system 101, shown by dashed line 558D. The service computing system 101 then determines the valid routing paths, shown by dashed line 559. Finally, the results, i.e., at least a subset of the details of at least a subset of the valid routing paths are returned to the client device 108, shown by dashed line 560.

The separate embodiments of FIGS. 5A, 5B, and 5C may also be combined and extended such that for some routing paths, the provider computing systems 109 are queried, for other routing paths third-party computing systems are queried that hold data for a plurality of providers and/or for other or even the same routing paths, some details may be queried by requesting the data from a database or data storage comprised by the service computing system 101. The queried third-party computing systems may also comprise a database providing standard industry rules.

Figure 6:
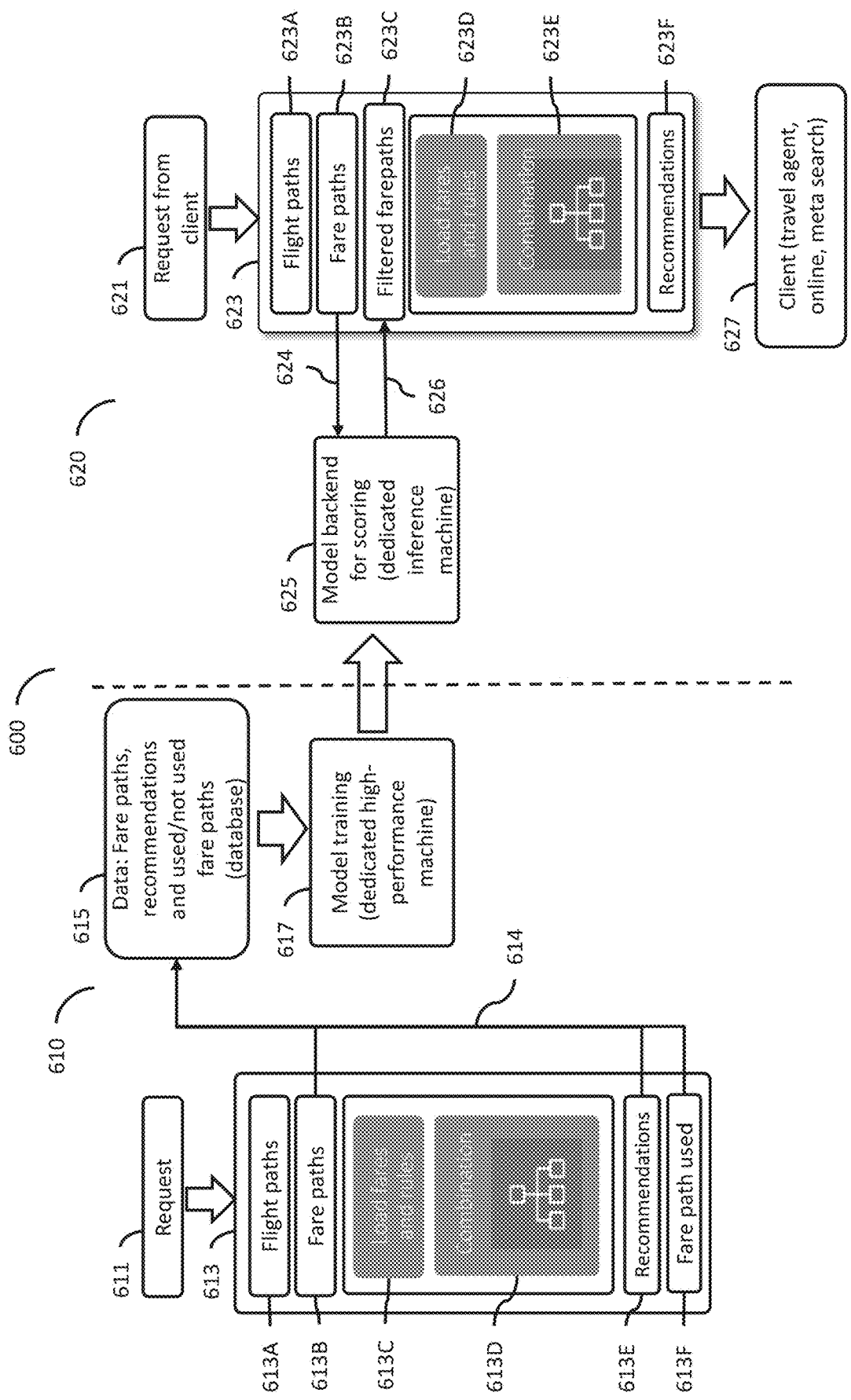
FIG. 6 depicts the workflow of the method described herein in a flight search environment.

FIG. 6 depicts the workflow 600 of a specific embodiment of the method 200, namely the application of the method in a flight search environment. As already mentioned, the method 200 can be separated into two parts, the training part 610 of the machine learning model and the application part 620 of the machine learning model.

In this embodiment, the route is a flight path and the set of characteristics comprises pricing units for flight paths; hence the routing path corresponds to a fare path. The pricing units are e.g., a one-way segment, a round trip, a single open jaw, a double open jaw, and a circle trip. The details that are queried for the subset of routing paths here comprise rules and fares, wherein the rules determine whether fares can be applied on a routing path. Determining valid routing paths comprises analysing the rules The training part 610 shows on the left side an example of a historical request 611 of a client, such as the client device 108. The request usually comprises a search for a flight from a departure location to a destination location. It may also comprise a date/time of the travel, mandatory intermediate stops and/or additional parameters.

The box 613 shows the process performed on the service computing system 101 without an application of a machine learning model to determine a subset of fare path. At first, possible flight paths 613A fulfilling the request 611 are determined. Then, possible fare paths 613B are determined, i.e., the flight paths are combined with possible pricing units. Then, rules and fares 613C are loaded for these fare paths.

Most airlines have a large number of different tariffs, that could be priced according to a set of restrictions called tariff combinations. Each tariff combination has a different set of rules, varying from possible combination with other airlines to geographical rules, such as domesticity. The rules relating to possible combinations are quite flexible and can be easily changed by airlines. Hence, they are not easily analysable. Fare Paths are in contrast stable through time. Therefore, despite volatility of fares and rules, the fare paths behind these fares and rules remain valid.

Since a plurality of fares may apply on one fare path, e.g., a fare for business travel and a fare for economy travel, providers may restrict usage of some fares on specific routes, and/or rules may define other restrictions etc., a combination process 613D takes place to build the final and valid fare paths used as recommendations 613E for the user. Additionally or alternatively, the historical data may be simulated, all actions comprised by the box 613 may result from a simulation of a client requesting model. The used fare path 613F, i.e., the fare path underlying recommendation booked by the client, is logged as well as the recommendations 613E and the originally constructed fare paths 613B, which is depicted by the line 614.

The logged historical data 615, i.e., data from a plurality of executions of box 613, is then stored in a database, e.g., the data storage 105. With this data, a machine learning model is trained 617, e.g., on the dedicated high-performance computing system 103. The model may be one of a gradient boosted tree, a neural network, or a random forest or a combination thereof.

The application part 620, i.e., that part comprising the execution of the machine learning model, shows on the right side an example of a new request 621 of a client, such as the client device 108. The request comprises a search for a flight from a departure location to a destination location. It may also comprise a date/time of the travel, mandatory intermediate stops and/or additional parameters.

The box 623 shows the process performed on the service computing system 101 including an application of the trained machine learning model to determine a subset of fare path. At first, possible flight paths 623A fulfilling the request 611 are again determined. Then, possible fare paths 623B are determined, i.e., the flight paths are combined with possible pricing units. These actions are identical to the actions 613A and 613B.

However, the fare paths 623B are here transmitted to the trained machine learning model 625, which is e.g., executed on the dedicated inference computing system 107. This transmission is depicted by line 614. The machine learning model 625 then scores the fare paths, i.e., determines the selection prediction and returns a subset of fare paths, which is depicted by line 626. Only for this subset of fare paths, i.e., the filtered fare paths 623C, the fares and rules 623D are queried. Then, a combination process 623E builds the final and valid fare paths. These are used as recommendations 623F for the client, which are sent as response 627 to the client, such as the client device 108.

Figure 7:
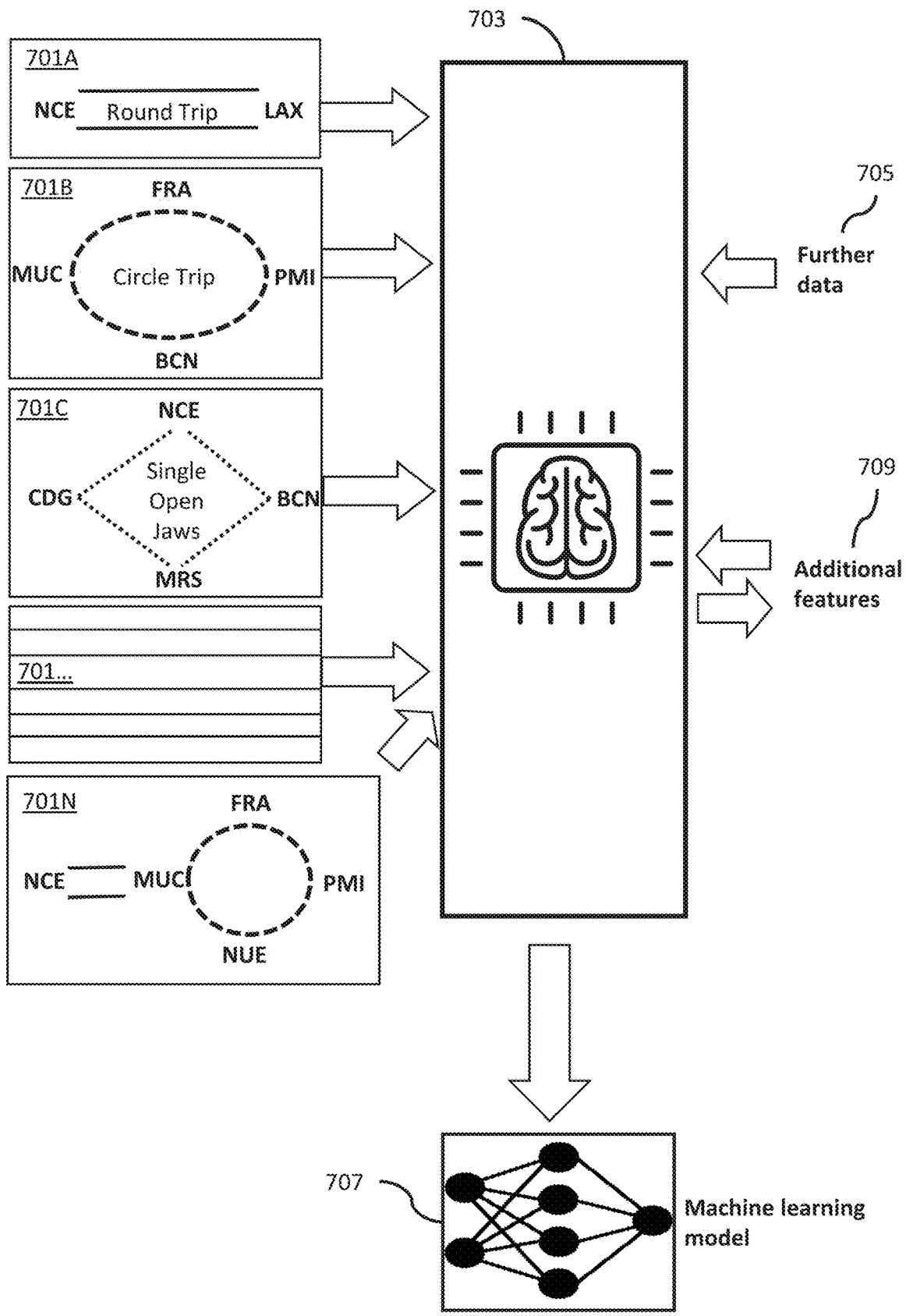
FIG. 7 presents a diagram of how the machine learning model is trained in a flight search environment.

FIG. 7 presents an exemplary diagram of how the machine learning model is trained in the flight search embodiment. On the left, several fare paths 701A . . . N that have been logged before, i.e., historical data of fare paths, are depicted. For example, fare path 701A is a fare path comprising a flight path from Nice to Los Angeles and back with the characteristic, i.e., pricing unit, of a round trip. Fare path 701B is a fare path comprising a flight path from Munich to Palma de Mallorca via Frankfurt and back via Barcelona comprising the characteristic, i.e., pricing unit, of a circle trip, which may mean that all segments are provided by one carrier or by a alliance of carriers. Fare path 701B is a fare path comprising a flight path from Munich to Palma de Mallorca via Frankfurt and back via Barcelona comprising the characteristic, i.e., pricing unit, of a circle trip, which may mean that all segments are provided by one carrier or by an alliance of carriers.

These fare paths 701A . . . N and further data 705, i.e., details of the underlying query for the fare path, if the fare path was provided to the client device 108, and if the fare path was finally booked by the client device 108, are provided during the training 703 of the machine learning model. The machine learning model may be one of a gradient boosted tree, a neural network, or a random forest or a combination thereof. The machine learning model may also be any other applicable machine learning model suitable to solve the underlying problem. The result is then a trained machine learning model 707, i.e., determined parameters to set up the machine learning model for the use in the travel context, wherein the machine learning model is trained to predict a probability that the respective fare path will be selected.

In an embodiment, at least one additional feature 709 of a route may be determined that has an impact on the selected routing path. For example, analysis of parameters of the model and/or the output of the trained model may show that the degree of deviation from a direct connection may have an impact on whether a routing path is selected or not. Alternatively or additionally, it may be determined that carrier information, i.e., information about carriers providing the routes, has an impact on whether a routing path is selected or not. This at least one additional feature is then determined for each fare path 701A . . . N and also used as additional input for the training. This additional feature is then also determined for fare paths during the application of the machine learning model 707.

Figure 8:
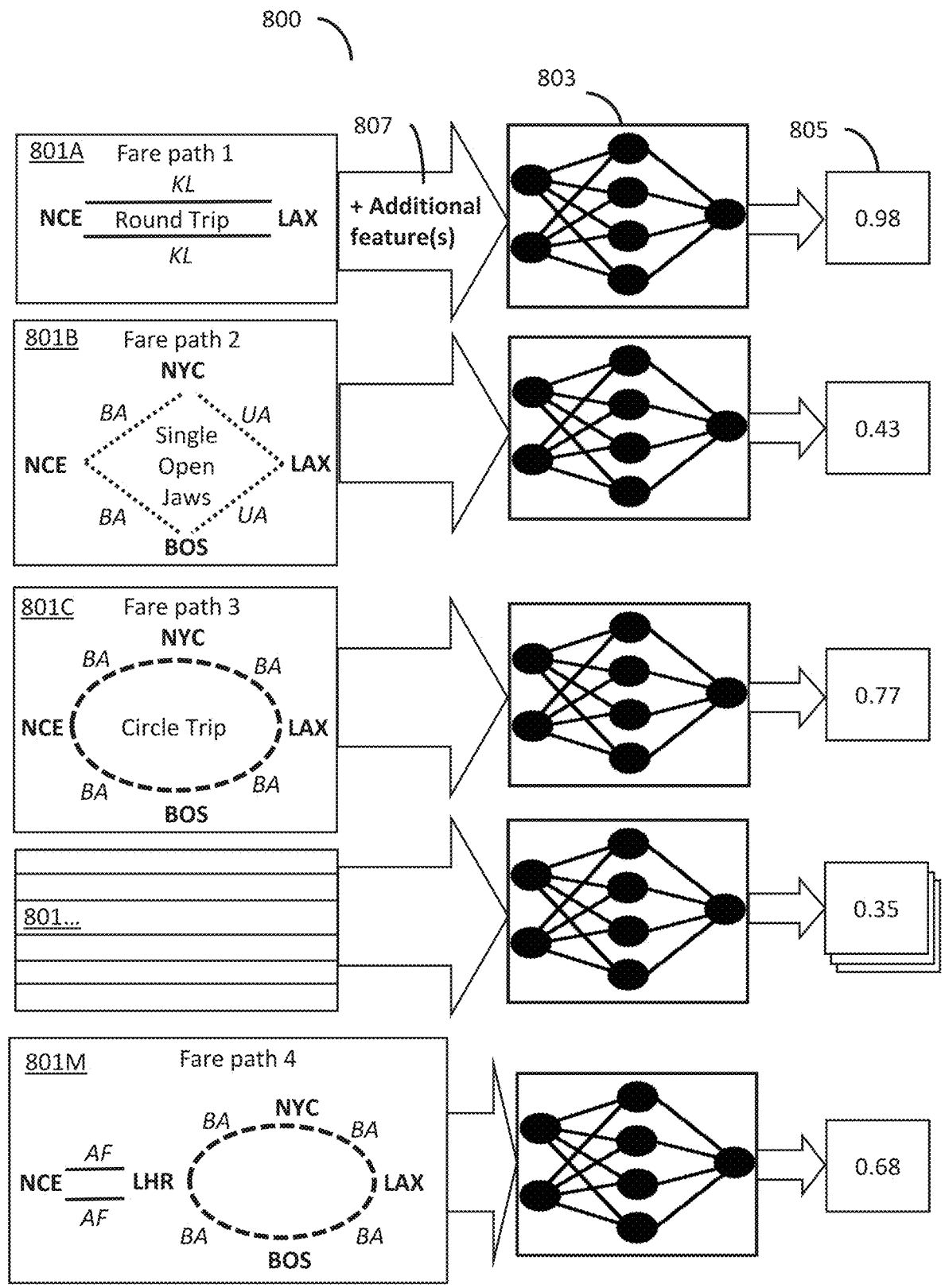
FIG. 8 presents a diagram of how the machine learning model is applied for selecting fare paths in a flight search environment.

FIG. 8 shows how the machine learning model is applied for selecting fare paths in a flight search environment on the example of a request for a connection from Nice to Los Angeles and back to Nice. After determining the flight paths (not shown), the fare paths 801A . . . M are determined, which may for example be a round trip 801A without intermediate stops. The fare path may also be flights with intermediate stops and operated by different carriers characterized in two single open jaws like the fare path 801B. The fare path may also comprise a circle trip 801C or may be combinations of several pricing units 801M. These fare paths 801A . . . M are then propagated through the machine learning model 803. The output 805 is then the selection prediction of the fare path, which is then compared to a threshold. For example, if the threshold is 0.5 in this example, at least the fare paths 801A, 801C and 801M will find their way into the subset of fare paths.

In some embodiments, at least one additional feature 807, corresponding to the additional feature 709, for each fare path is calculated which is additionally used as input for the machine learning model. Thereby, the model output 805 can be significantly improved.

Figure 9:
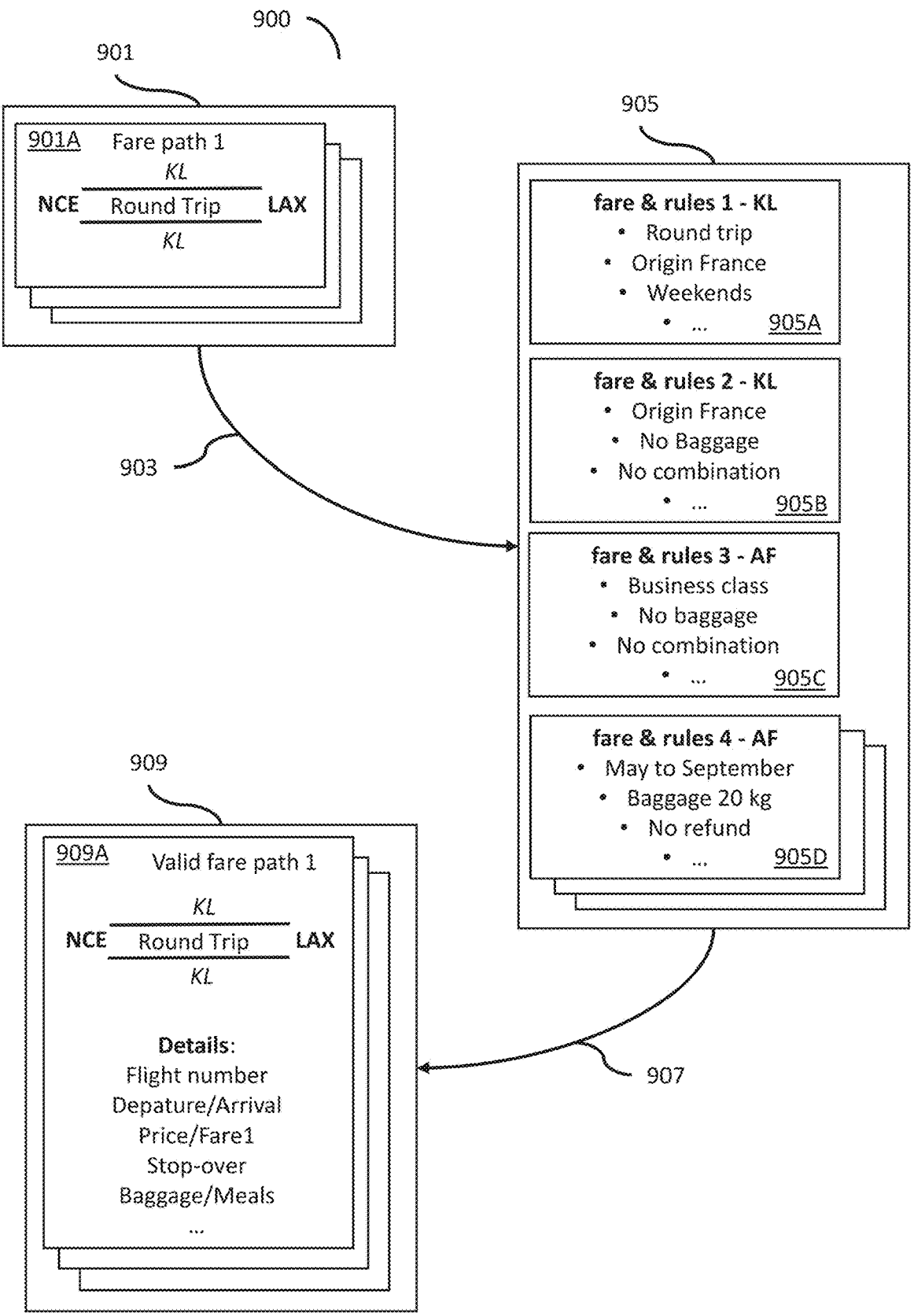
FIG. 9 depicts how valid fare paths are determined.

FIG. 9 depicts how valid fare paths are determined from the fare paths and the queried details. Details for the subset of fare paths 901 that have been determined by the use of the machine learning model are queried, e.g., from the providers of these fare paths, shown by line 903. These details comprise fares and rules 905. In this example, "fare & rules 1" 905A and "fare & rules 2" 905B may be fares and rules from KLM, "fare & rules 3" 905C and "fare & rules 4" 905D may be fares and rules from Air France and there may be many other providers that provide fares and rules for the fare paths 901. The queried details may also comprise further flight data, such as flight number, departure/arrival time, and the like. Alternatively, such data may also be already comprised by the flight paths or fare paths.

The fares & rules 905 are used to build the final products, shown by line 907, from the fare paths, i.e., a set of valid fare paths 909 is determined. If a fare is applicable according to the rules, then the final product is built. The details of the valid fare paths 909 may be a subset of the details of the fare and rules 905. In this example, the fare path 901A is combined with the fare and rules 905A to build the valid fare path 909A. In some embodiments all valid fare paths 909 are returned to the client device 108 for display and selection of a fare path by a user or a program. In other embodiments, only a subset it returned to the client device.

Figure 10:
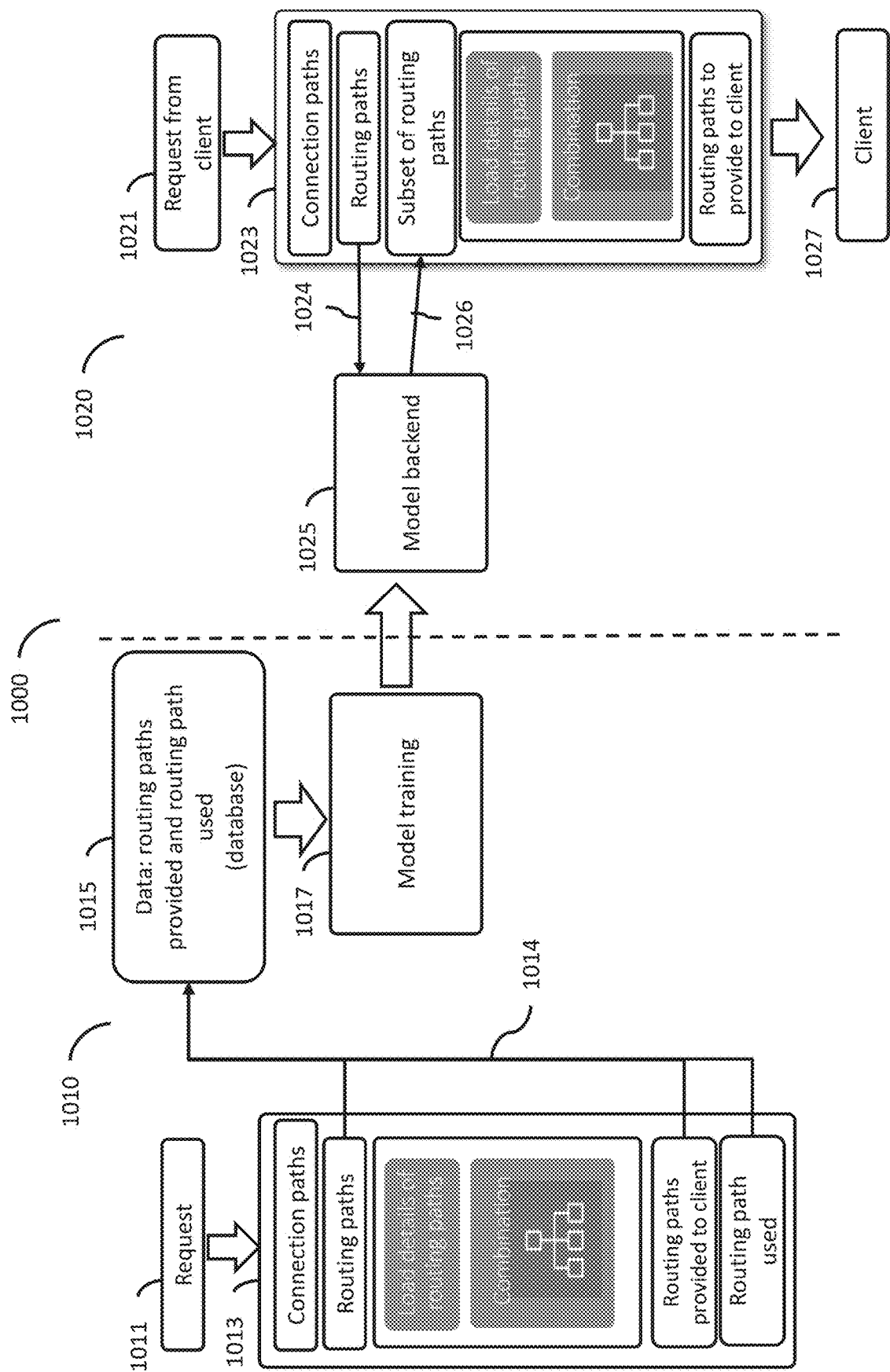
FIG. 10 shows the workflow of the method described herein in a network routing environment.

FIG. 10 shows the workflow of the method described herein in a network routing environment. As already mentioned, the method 200 can be separated into two parts, the training part 1010 of the machine learning model and the application part 1020 of the machine learning model.

In this embodiment, the route is a connection path in a network to transport data packets and the set of characteristics comprises different transmission speeds and/or transmittable volumes of data. The training part 1010 shows on the left side an example of a historical request 1011 of a client, such as the client device 108. The request for a connection path usually comprises at least a start node and an end node, e.g., specified by an IP address in the network. The request may also comprise a number of data packets to be sent to the end node.

The box 1013 shows the process performed on the service computing system 101 without an application of a machine learning model to determine a subset of routing paths. Therefore, possible connection paths are determined and combined with characteristics to determine a set of routing paths. Then, the details of these routing paths are determined. A combination process determines valid routing paths and provides at least a subset of them to the requesting clients. The selected, i.e., used, routing paths, the provided routing paths and the originally determined set of routing paths is logged, which is depicted by the line 1014.

The logged historical data 1015, i.e., data from a plurality of executions of box 1013, is then stored in a database, e.g., the data storage 105. With this data, a machine learning model is trained 1017, e.g., on the dedicated high-performance computing system 103. The model may be one of a gradient boosted tree, a neural network, or a random forest or a combination thereof.

The application part 1020, i.e., that part comprising the execution of the machine learning model, shows on the right side an example of a new request 1021 of a client, such as the client device 108. The request 1021 is a connections request as the request 1011. The box 1023 shows the process performed on the service computing system 101 including an application of the trained machine learning model to determine a subset of fare path.

The difference to the process 1013 is basically that the set of routing paths is sent to a model backend 1025 comprising the trained machine leaning model. Then, the machine learning model determines a subset of routing paths having a selection probability higher than a threshold and returns this subset to the service computing system 101, shown by line 1026. Only for this subset of routing paths, the details are queried and the final valid routing paths are built, which are sent send are response 1027 to the client, such as the client device 108.

It should be appreciated that while particular embodiments and variations of the invention have been described herein, further modifications and alternatives will be apparent to persons skilled in the relevant arts. In particular, the examples are offered by way of illustrating the principles of the invention, and to provide a number of specific methods and arrangements for putting those principles into effect.

The described methods and systems simplify the computation of results in technical areas, in which the results consist in complex combinations of components following a graph or sequence structure. A machine learning model is trained on historical data to learn to predict a value and to select the type of graph or sequence with the highest values for the final combination forming the result. The method is used at run time in the generation of the result to a request to prioritize the most valuable sub-portion of the graph, reducing search space of the combination of components on these graphs, thus improving the product and reducing the computation costs. The methods described herein can be applied on abstraction layers of the components, removing the need to perform the evaluation for all possible set of components.

Although the machine learning model in the methods described herein is used to create a subset of routing paths, e.g., to filter fare paths, the person skilled in the art will know that the algorithm can also be driven by the models and guide the exploration of an underlying problem graph.

In general, the routines executed to implement the embodiments of the invention, whether implemented as part of an operating system or a specific application, component, program, object, module or sequence of instructions, or even a subset thereof, may be referred to herein as "computer program code" or simply "program code". Program code typically comprises computer-readable instructions that are resident at various times in various memory and storage devices in a computer and that, when read and executed by one or more processors in a computer, cause that computer to perform the operations necessary to execute operations and/or elements embodying the various aspects of the embodiments of the invention. Computer-readable program instructions for carrying out operations of the embodiments of the invention may be, for example, assembly language or either source code or object code written in any combination of one or more programming languages.

Various program code described herein may be identified based upon the application within that it is implemented in specific embodiments of the invention. However, it should be appreciated that any particular program nomenclature that follows is used merely for convenience, and thus the invention should not be limited to use solely in any specific application identified and/or implied by such nomenclature. Furthermore, given the generally endless number of manners in which computer programs may be organized into routines, procedures, methods, modules, objects, and the like, as well as the various manners in which program functionality may be allocated among various software layers that are resident within a typical computer (e.g., operating systems, libraries, API's, applications, applets, etc.), it should be appreciated that the embodiments of the invention are not limited to the specific organization and allocation of program functionality described herein.

The program code embodied in any of the applications/modules described herein is capable of being individually or collectively distributed as a program product in a variety of different forms. In particular, the program code may be distributed using a computer-readable storage medium having computer-readable program instructions thereon for causing a processor to carry out aspects of the embodiments of the invention.

Computer-readable storage media, which is inherently non-transitory, may include volatile and non-volatile, and removable and non-removable tangible media implemented in any method or technology for storage of information, such as computer-readable instructions, data structures, program modules, or other data. Computer-readable storage media may further include random access memory (RAM), read-only memory (ROM), erasable programmable read-only memory (EPROM), electrically erasable programmable read-only memory (EEPROM), flash memory or other solid state memory technology, portable compact disc read-only memory (CD-ROM), or other optical storage, magnetic cassettes, magnetic tape, magnetic disk storage or other magnetic storage devices, or any other medium that can be used to store the desired information and which can be read by a computer. A computer-readable storage medium should not be construed as transitory signals per se (e.g., radio waves or other propagating electromagnetic waves, electromagnetic waves propagating through a transmission media such as a waveguide, or electrical signals transmitted through a wire). Computer-readable program instructions may be downloaded to a computer, another type of programmable data processing apparatus, or another device from a computer-readable storage medium or to an external computer or external storage device via a network.

Computer-readable program instructions stored in a computer-readable medium may be used to direct a computer, other types of programmable data processing apparatus, or other devices to function in a particular manner, such that the instructions stored in the computer-readable medium produce an article of manufacture including instructions that implement the functions, acts, and/or operations specified in the flow charts, sequence diagrams, and/or block diagrams. The computer program instructions may be provided to one or more processors of a general purpose computer, a special purpose computer, or other programmable data processing apparatus to produce a machine, such that the instructions, which execute via the one or more processors, cause a series of computations to be performed to implement the functions, acts, and/or operations specified in the flow charts and/or sequence diagrams.

The terminology used herein is for the purpose of describing particular embodiments only and is not intended to be limiting of the embodiments of the invention. It will be further understood that the terms "comprises" and/or "comprising", when used in this specification, specify the presence of stated features, integers, steps, operations, elements, and/or components, but do not preclude the presence or addition of one or more other features, integers, steps, operations, elements, components, and/or groups thereof. Furthermore, to the extent that the terms "includes", "having", "has", "with", "comprised of", or variants thereof are used in either the detailed description or the claims, such terms are intended to be inclusive in a manner similar to the term "comprising".

Accordingly, the described embodiments should be understood as being provided by way of example, for the purpose of teaching the general features and principles of the invention, but should not be understood as limiting the scope of the invention, which is as defined in the appended claims.

What is claimed is:

1. A method comprising:
    at a first device comprising one or more processors:
    obtaining historical travel data of selected fare paths, wherein the historical travel data comprises at least one historical characteristic of a plurality of historical characteristics for each selected fare path;
    storing the historical travel data of selected fare paths in a data storage, wherein a machine learning model is trained at a second device based on the historical travel data of selected fare paths received from the data storage by iteratively:
        evaluating the plurality of historical characteristics associated with the selected fare paths,
        determining a selection prediction for each selected fare path based on the plurality of historical characteristics,
        determining one or more features of a plurality of features that have an impact on the selected fare paths, and
        updating the machine learning model using the determined one or more features as additional inputs; and
    in response to a travel search request from a client device:
        determining a set of flight paths fulfilling the travel search request and based on at least one characteristic of a set of characteristics associated with the travel search request;
        determining a set of fare paths by combining the set of flight paths with pricing units from a set of pricing units;
        applying the machine learning model at the second device on the set of fare paths to determine, based on the travel search request and the at least one characteristic associated with the travel search request, a subset of fare paths for which the selection prediction is higher than a threshold;
        querying details of the subset of fare paths, wherein querying details of the subset of fare paths comprises querying at least one carrier providing a fare path in the subset of fare paths and a third-party system providing fare path selection rules;
        determining, based on the at least one characteristic associated with the travel search request, valid fare paths; and
        returning the details of at least a subset of the valid fare paths to the client device.

2. The method of claim 1 wherein the second device is a dedicated computing system comprising a cluster of servers, and each server is equipped with at least one central processing unit and at least one graphics processing unit enabling parallel processing of the training.

3. The method of claim 1 wherein the second device is a dedicated inference computing system comprising a hardware-based inference accelerator architecture.

4. The method of claim 1 wherein the one or more features are used as an additional input for the machine learning model.

5. The method of claim 4 wherein the plurality of features comprises a latitude and a longitude of a departure location of each flight path, a latitude and a longitude of an arrival location of each flight path, a deviation from a direct connection, and one or more carriers providing each flight path.

6. The method of claim 1 wherein querying the details of the subset of fare paths comprises:
    querying one or more carriers providing each flight path.

7. The method of claim 1 wherein determining valid fare paths comprises:
    analysing the queried details of the subset of fare paths for applicability to the travel search request of the client device.

8. The method of claim 1 wherein the historical travel data of selected fare paths comprises at least one pricing unit from the set of pricing units from details of selected fare paths.

9. The method of claim 1 wherein the machine learning model is a gradient boosted tree or a neural network.

10. The method of claim 1 wherein the pricing units comprise one-way, round trip, single open jaw, double open jaw, or circle trip.

11. The method of claim 1 wherein determining valid fare paths comprises:
    analysing the fare path selection rules provided by one or more carriers providing each flight path.

12. The method of claim 1 wherein the details of the subset of fare paths comprise a final price, a flight number, a departure time, an arrival time, stop-over times, baggage rules, and/or included meals.

13. A distributed computing system comprising:
    a computing system configured to receive and answer requests for fare paths from client devices; and
    a data storage connected with the computing system;
    wherein the computing system is configured to execute instructions comprising:
        at a first device comprising one or more processors:
        obtain historical travel data of selected fare paths, wherein the historical travel data comprises at least one historical characteristic of a plurality of historical characteristics for each selected fare path;
        store the historical travel data of selected fare paths in the data storage, wherein a machine learning model is trained at a second device based on the historical travel data of selected fare paths received from the data storage by iteratively:
            evaluating the plurality of historical characteristics associated with the selected fare paths,
            determining a selection prediction for each selected fare path based on the plurality of historical characteristics, determining one or more features of a plurality of features that have an impact on the selected fare paths, and updating the machine learning model using the determined one or more features as additional inputs; and in response to a travel search request from a client device:

determine a set of flight paths fulfilling the travel search request and based on at least one characteristic of a set of characteristics associated with the travel search request;

determine a set of fare paths by combining the set of flight paths with pricing units from a set of pricing units;

apply the machine learning model at the second device on the set of fare paths to determine, based on the travel search request and the at least one characteristic associated with the travel search request, a subset of fare paths for which the selection prediction is higher than a threshold;

query details of the subset of fare paths, wherein querying details of the subset of fare paths comprises querying at least one carrier providing a fare path in the subset of fare paths and a third-party system providing fare path selection rules;

determine, based on the at least one characteristic associated with the travel search request, valid fare paths; and return the details of at least a subset of the valid fare paths to the client device.

14. The distributed computing system of claim 13, wherein the second device is a dedicated computing system including a cluster of servers, each server is equipped with at least one central processing unit and at least one graphics processing unit enabling parallel processing of the training, and the machine learning model is trained at the dedicated computing system.

15. The distributed computing system of claim 13 wherein the second device comprises a hardware-based inference accelerator architecture, and the machine learning model is applied at the hardware-based inference accelerator architecture.

16. The distributed computing system of claim 6 wherein the one or more features are used as an additional input for the machine learning model.

17. The distributed computing system of claim 16 wherein the plurality of features comprises a latitude and a longitude of a departure location of each flight path, a latitude and a longitude of an arrival location of each flight path, a deviation from a direct connection, and one or more carriers providing each flight path.

18. The distributed computing system of claim 13 wherein query the details of the subset of fare paths comprises:

query one or more carriers providing each flight path.

19. The distributed computing system of claim 13 wherein determine the valid fare paths comprises:

analyse the queried details of the subset of fare paths for applicability to the travel search request.

20. The distributed computing system of claim 13 wherein the historical travel data of selected fare paths comprises at least one pricing unit from the set of pricing units from details of selected fare paths.

21. The distributed computing system of claim 13 wherein the machine learning model is a gradient boosted tree or a neural network.

22. The distributed computing system of claim 13 wherein the pricing units comprise one-way, round trip, single open jaw, double open jaw, or circle trip.

23. The distributed computing system of claim 13 wherein determine the valid fare paths comprises:

analyse rules provided by one or more carriers providing each flight path.

24. The distributed computing system of claim 13 wherein the details of the subset of fare paths comprise a final price, a flight number, a departure time, an arrival time, stop-over times, baggage rules, or included meals.

25. A non-transitory computer-readable storage medium comprising instructions that upon execution by a processor of a computing device cause the computing device to selecting fare paths, the instructions comprising:

at a first device comprising one or more processors:

obtain historical travel data of selected fare paths, wherein the historical travel data comprises at least one historical characteristic of a plurality of historical characteristics for each selected fare path;

store the historical travel data of selected fare paths in a data storage, wherein a machine learning model is trained at a second device based on the historical travel data of selected fare paths received from the data storage by iteratively:

evaluating the plurality of historical characteristics associated with the selected fare paths, determining a selection prediction for each selected fare path based on the plurality of historical characteristics, determining one or more features of a plurality of features that have an impact on the selected fare paths, and updating the machine learning model using the determined one or more features as additional inputs; and in response to a travel search request from a client device:

determine a set of flight paths fulfilling the travel search request and based on at least one characteristic of a set of characteristics associated with the travel search request;

determine a set of fare paths by combining the set of flight paths with pricing units from a set of pricing units;

apply the machine learning model on the set of fare paths to determine, based on the travel search request and the at least one characteristic associated with the travel search request, a subset of fare paths for which the selection prediction is higher than a threshold;

query details of the subset of fare paths, wherein querying details of the subset of fare paths comprises querying at least one carrier providing a fare path in the subset of fare paths and a third-party system providing fare path selection rules;

determine, based on the at least one characteristic associated with the travel search request, valid fare paths; and return the details of at least a subset of the valid fare paths to the client device.

26. The method of claim 1, wherein the machine learning model is updated by the second device based on a determination at the first device of a prediction of which characteristics reduce a search space associated with a search request.

* * * * *